(12) United States Patent
Beck, Jr. et al.

(10) Patent No.: US 12,030,554 B2
(45) Date of Patent: Jul. 9, 2024

(54) VEHICLE FLOOR WATER FLOW MANAGEMENT

(71) Applicant: Auria Solutions UK I, Ltd., London (GB)

(72) Inventors: Gabriel B. Beck, Jr., North Canton, OH (US); Tyler Madison Heath, Mount Gilead, NC (US)

(73) Assignee: AURIA SOLUTIONS UK I LTD, London (GB)

( * ) Notice: Subject to any disclaimer, the term of this patent is extended or adjusted under 35 U.S.C. 154(b) by 318 days.

(21) Appl. No.: 17/562,129

(22) Filed: Dec. 27, 2021

(65) Prior Publication Data

US 2022/0126739 A1 Apr. 28, 2022

Related U.S. Application Data

(63) Continuation of application No. 16/614,523, filed as application No. PCT/US2019/060015 on Nov. 6, 2019, now Pat. No. 11,214,184.

(60) Provisional application No. 62/756,289, filed on Nov. 6, 2018.

(51) Int. Cl.
*B62D 25/20* (2006.01)
*B60N 3/04* (2006.01)
*B62D 29/04* (2006.01)

(52) U.S. Cl.
CPC .......... *B62D 25/20* (2013.01); *B62D 25/2036* (2013.01); *B60N 3/04* (2013.01); *B62D 29/04* (2013.01)

(58) Field of Classification Search
CPC ............. B62D 25/20; B62D 25/2054; B62D 25/2072; B62D 25/24; B62D 29/001; B62D 29/004; B62D 29/005; B62D 29/04

USPC .................... 296/193.07, 38, 97.23
See application file for complete search history.

(56) References Cited

U.S. PATENT DOCUMENTS

| 4,402,545 | A  | * | 9/1983  | Utsunomiya | ........ B62D 25/025 |
|-----------|----|---|---------|------------|---------------------|
|           |    |   |         |            | 296/204             |
| 4,420,180 | A  |   | 12/1983 | Dupont et al. | |
| 6,347,454 | B1 |   | 2/2002  | Jurica et al. | |
| 7,597,386 | B2 | * | 10/2009 | Egawa | ............... B62D 25/2036 |
|           |    |   |         |            | 296/193.07          |

(Continued)

FOREIGN PATENT DOCUMENTS

| CA | 2286940 A1 | 4/2001 |
| EP | 1982902 A1 | 10/2008 |
| GB | 820058 A   | 9/1959 |

OTHER PUBLICATIONS

Extended European Search Report from related European U.S. Appl. No. 19/883,132 dated Sep. 26, 2022.

(Continued)

*Primary Examiner* — Dennis H Pedder
(74) *Attorney, Agent, or Firm* — Grossman, Tucker, Perreault & Pfleger PLLC; Steven J. Grossman (57) ABSTRACT

A vehicle floor configured to direct water flow comprising a floor portion that extends front-to-back and side-to-side in the vehicle including a surface that faces the vehicle occupant. The floor portion surface includes one or a plurality of raised rib portions and one or a plurality of web regions in-between said raised rib portions, wherein the one or plurality of web regions provides a downwardly sloping floor surface that is configured to direct water to one or a plurality of desired locations.

7 Claims, 7 Drawing Sheets

(56) References Cited

U.S. PATENT DOCUMENTS

| | | |
|---|---|---|
| 7,686,371 B2 | 3/2010 | MacNeil |
| 7,785,692 B1 | 8/2010 | Siegel |
| 8,163,369 B2 | 4/2012 | Stanesic et al. |
| 9,090,180 B2 | 7/2015 | Hay |
| 2008/0213537 A1 | 9/2008 | Alford |
| 2016/0242621 A1 | 8/2016 | Siegel |

OTHER PUBLICATIONS

International Search Report and Written Opinion of International Application No. PCT/US2019/60015, mail date Feb. 18, 2020, 31 pages.

First Examination Report from related Indian Application No. 202117022816, mailed Aug. 8, 2022.

* cited by examiner

VEHICLE FLOOR WATER FLOW MANAGEMENT

CROSS REFERENCE TO RELATED APPLICATIONS

This application is a Continuation of U.S. application Ser. No. 16/614,523 filed on Nov. 18, 2019, which is a 371 of PCT/US19/60015 filed Nov. 6, 2019, which claims the benefit of priority to U.S. Provisional Application 62/756,289 filed on Nov. 6, 2018, entitled Vehicle Floor Water Flow Management, which is incorporated by reference herein in its entirety.

FIELD

The present invention stands directed at a vehicle floor design that contains and routes water and debris to one or more desired locations within the vehicle where it can be disposed to the outside.

BACKGROUND

Vehicles are typically driven under conditions where the interior of the vehicle, and particularly the floor, becomes wet and collects debris, including but not limited to mud, sand, dirt and in the winter, slush. Such debris then accumulates on the vehicle floor which can then re-soil a driver's or passenger's shoes, create slippery conditions, and provide undesirable stains within the vehicle interior.

In response to the above, various floor tray design have been proposed that rely upon ribs and raised treads which form channels. While water, mud and slush may then accumulate in the channels, they ultimately can overflow to soil the vehicle flooring and soil the shoes of the occupants. Furthermore, the use of floor tray designs ultimately require the consumer to remove the mat or tray to dispose of accumulated water/debris.

A need remains therefore for a vehicle floor design that successfully contains and controls the movement of water and debris and which also allows one to direct the water/debris to one or more specific location along with the convenient removal of such debris to the vehicle exterior so that it does not accumulate within the vehicle interior.

SUMMARY

In one general embodiment, the present invention provides a vehicle floor configured to direct water flow comprising a floor portion that extends front-to-back and side-to-side in said vehicle including a surface that faces the vehicle occupant. The floor portion surface includes one or a plurality of raised rib portions and one or a plurality of web regions in-between the raised rib portions, wherein the one or plurality of web regions provides a downwardly sloping floor portion in the surface that is configured to direct water to one or a plurality of desired locations.

In another general embodiment, the present invention provides a vehicle floor configured to direct water flow comprising a floor portion that extends front-to-back and side-to-side in the vehicle including a surface that faces the vehicle occupant, wherein the surface that faces the vehicle occupant provides a downward slope of up to 10° running front-to back in the vehicle and a downward slope of up to 10° running side-to-side in the vehicle. One or a plurality of L-shaped protrusions are present in the vehicle floor surface wherein the L-shaped protrusions are comprised of two linear portions that intersect and define an angle of 75° to 115°. One or a plurality of web regions are present between the plurality of L-shaped protrusions wherein the web regions provide a downwardly sloping surface at an angle in the range of 0.5° to 20.0°. The downwardly sloping floor surface running front-to-back in the vehicle and side-to-side in said vehicle, the one or plurality of L-shaped protrusions, and the one or plurality of web regions between the plurality of L-shaped protrusions, are configured to direct water flow to one or a plurality of desired locations.

DESCRIPTION

Figure 1:
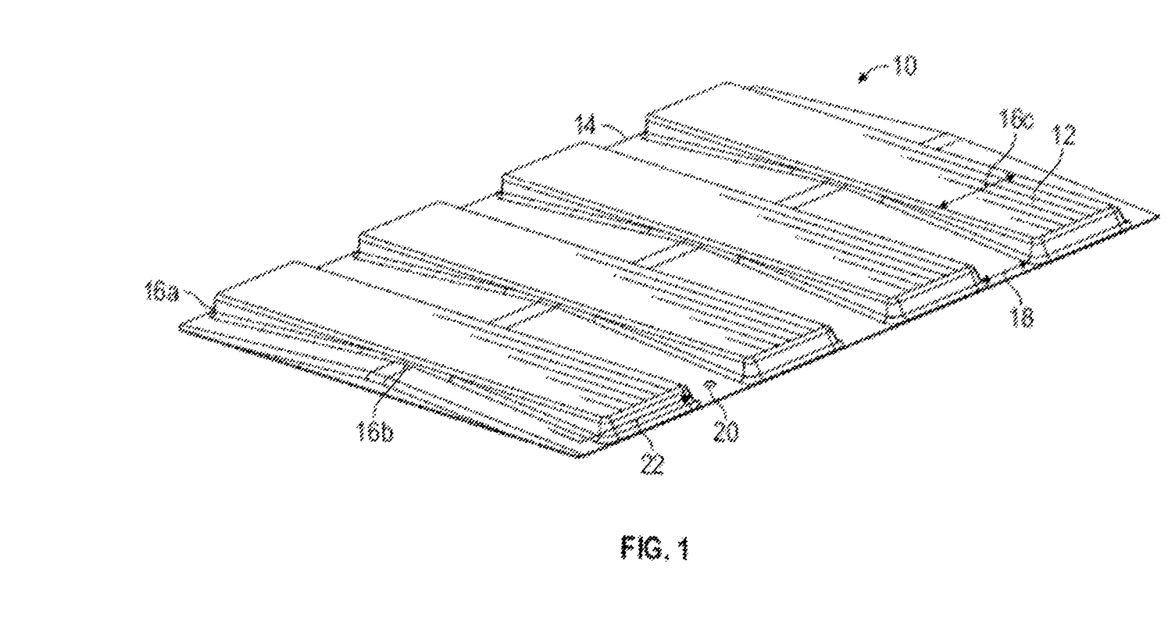
FIG. 1 is one preferred embodiment of the vehicle floor.

The present invention is directed at a vehicle floor design that routes water and debris to one or more specific locations in the floor for disposal to the outside. Attention is directed to FIG. 1 which illustrates one preferred embodiment of the present invention. As illustrated, a portion of the vehicle floor 10 is one that includes a plurality of raised portions 12 and a plurality of sloping web portions 14 in-between said raised portions 12. Preferably the raised portions may be in the form of ribs (an extended portion of relatively thicker material across the surface of the floor) and may have a thickness at 16A in the range of 3 mm to 50 mm, a thickness at 16B in the range of 3 mm to 50 mm. Thickness herein is reference to the height of the ribs from the surface of the floor. The ribs may also have a width shown generally at 16C in the range of 3 mm to 250 mm and the sloping portions 14 may have a width shown generally at 18 in the range of 5 mm to 200 mm. The width of the ribs may also be different than the width of the slopes, so that one can provide a floor structure with such varying dimensions to optimize water and debris disposal. In addition, the floor is one that will have one or more drainage holes or openings 20, preferably positioned at that section of the sloping portion where the water would collect, which drainage hole is preferably plugged, and which the occupant of the vehicle may selectively open to provide for removal of the water/debris mixture to the outside of the vehicle compartment. Moreover, it is contemplated that the vehicle floor 10 may include openings within the rib portions so that water/debris within one sloping portion may collect at one or more desired locations, as generally indicated at 22.

Figure 2:
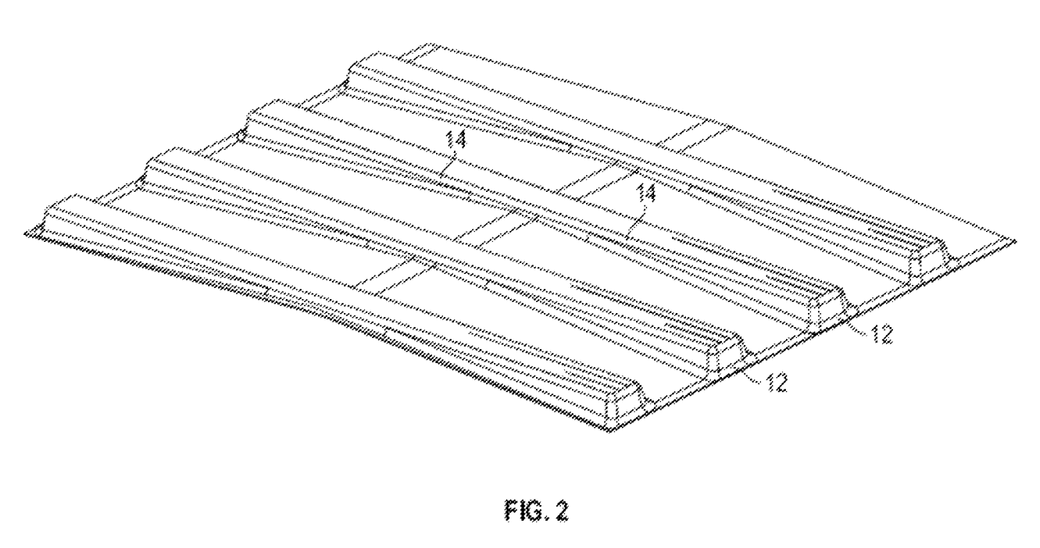
FIG. 2 is another embodiment of the vehicle floor.

FIG. 2 illustrates another vehicle floor where, compared to FIG. 1, the rib portions 12 and the sloping portions 14 are illustrated as having a different width. As noted, above, the ability to selective vary the width of either the rib portions and sloping portions allows one to provide a floor where one can selectively collect different amounts of water/debris, depending upon a given vehicle structure and expected pattern of use by the vehicle owner.

Figure 3:
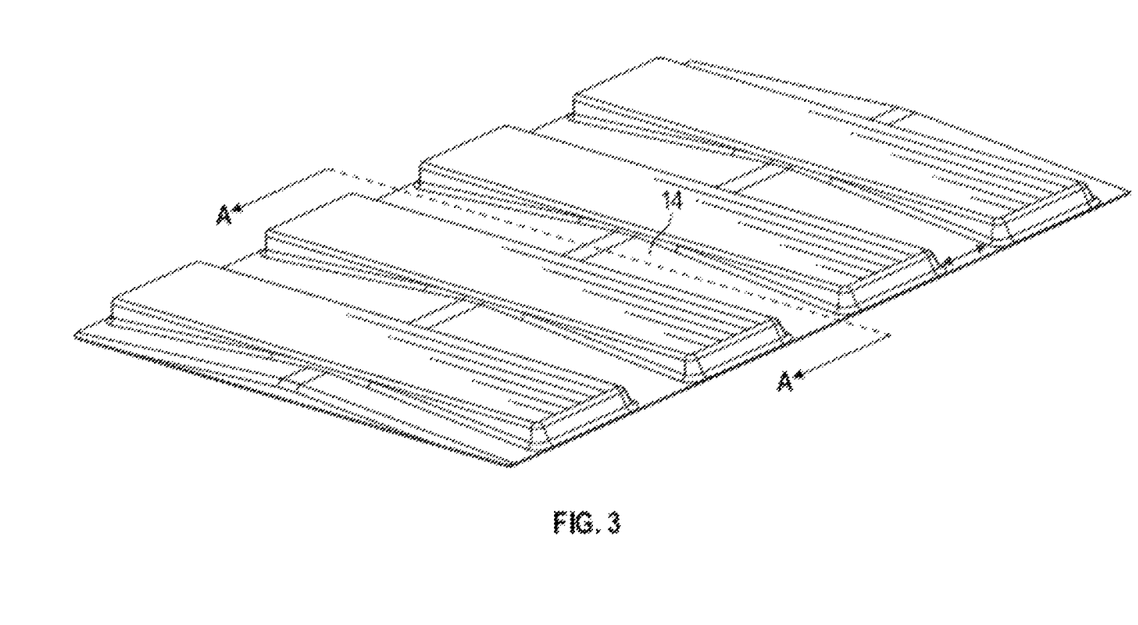
FIG. 3 shows the vehicle floor and the section A-A which view is illustrated in FIG. 4.
Figure 4:
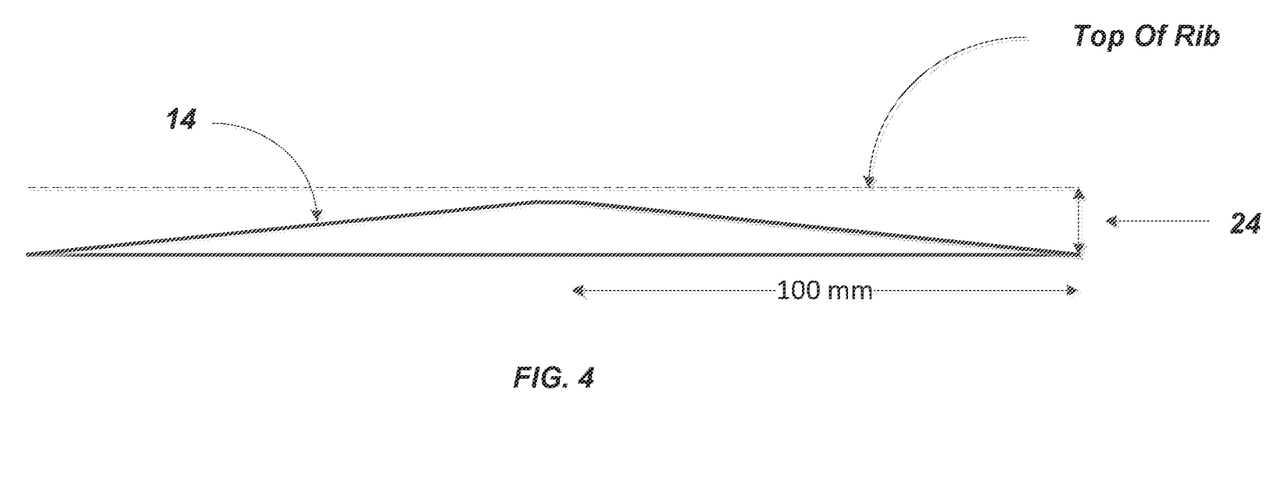
FIG. 4 shows section A-A from FIG. 3.

Attention is next directed to FIG. 3 which shows the vehicle floor and the section A-A which view is illustrated in FIG. 4. As can now be seen, the slope, measured with reference to the top of the rib, is such that it will preferably fall 0.5 mm to 20.0 mm for every 100 mm of length of the vehicle floor, running fore/aft in the vehicle. Accordingly, the arrow shown generally at 24 may have a value of 0.5 mm to 20.0 mm, thereby defining the slope that is then relied upon to channel water/debris to a desired location.

Figure 5:
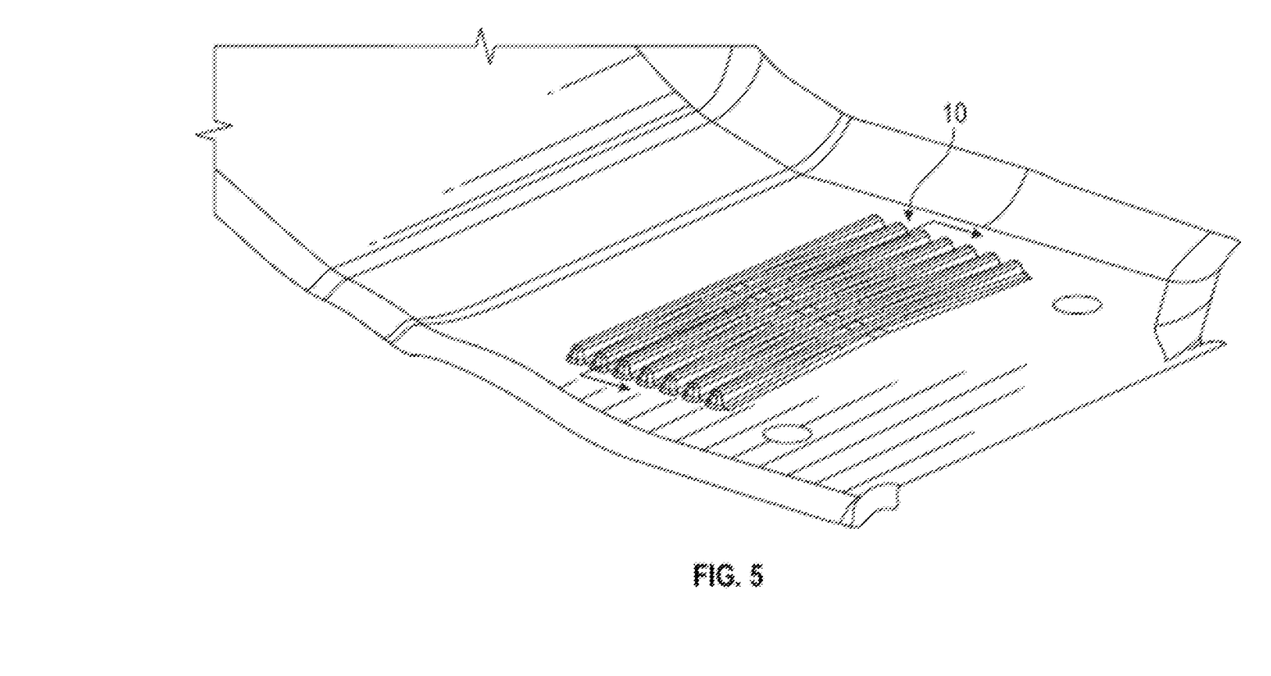
FIG. 5 shows the portion of the vehicle floor containing raised portions and sloping portions.

Attention is now directed to FIG. 5, which shows the portion 10 of the vehicle floor containing the aforementioned raised portions and sloping portions. As illustrated the sloping portions provide that the water flow would initially proceed generally left and right in the vehicle and then upon exiting of the sloping portions, the vehicle floor itself can include one or more sloping portions to further direct the water flow generally aft in the vehicle towards the identified one or more drain holes.

Figure 6:
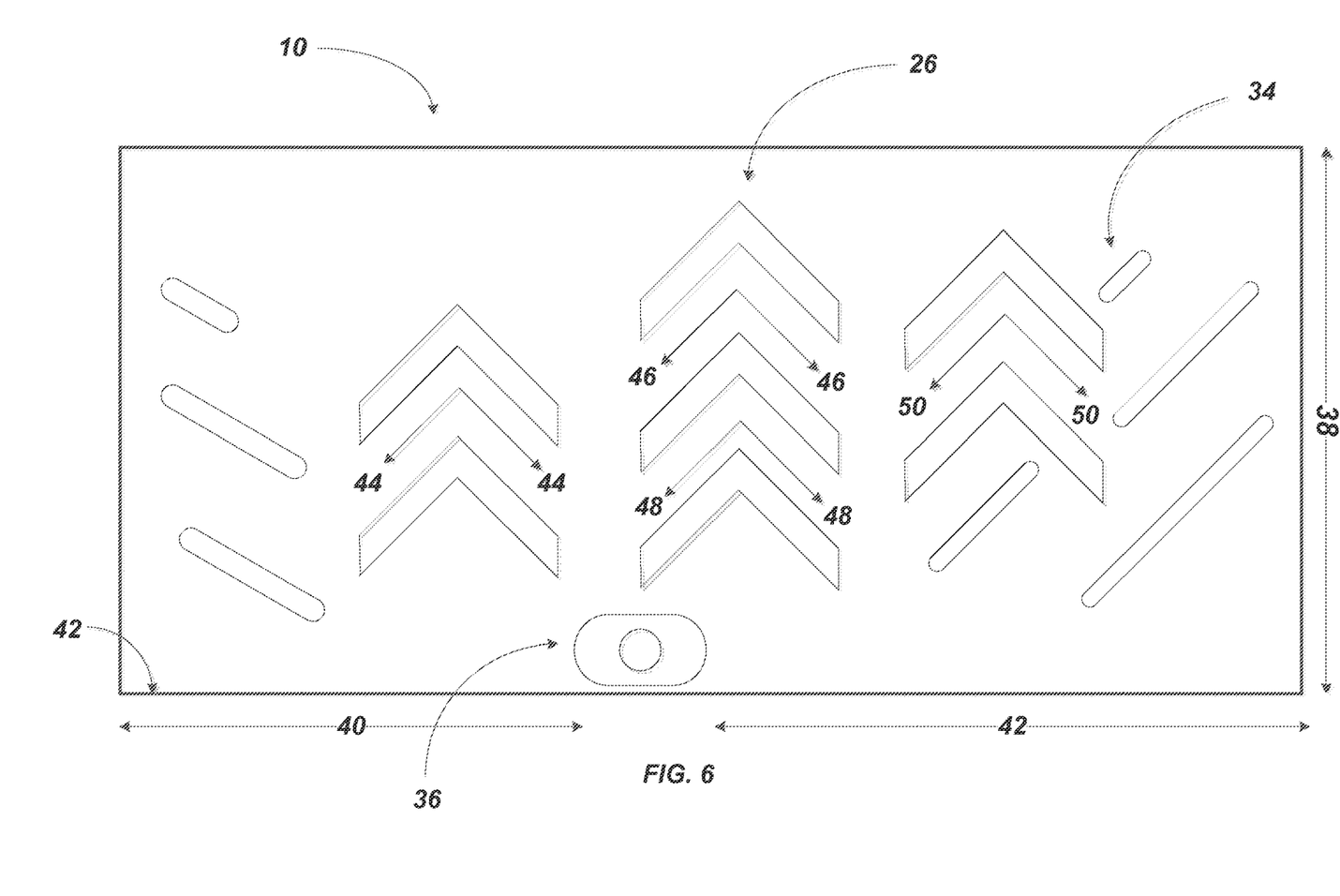
FIG. 6 illustrates another preferred embodiment of the vehicle floor.
Figure 7:
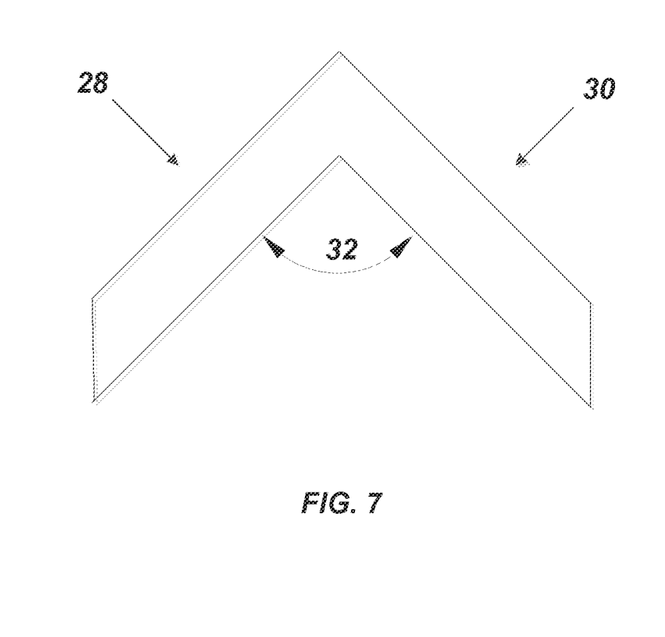
FIG. 7 provides an expanded view of the "L" shaped protrusions.

Attention is next directed to FIG. 6. which illustrates another preferred embodiment herein. As can be seen, the portion 10 of the vehicle floor may now include what may be described as a plurality of "L" shape rib protrusions 26. An expanded view of one of the "L" shaped protrusions is illustrated in FIG. 7 where such protrusion is defined by two generally linear portions 28 and 30 where each preferably has a length in the range of 12.5 mm to 250 mm and a thickness (i.e. the dimension that protrudes from the surface of the floor) in the range of 1.0 mm to 30 mm. These two generally linear portions 28 and 30 also preferably define an angle 32 of 75° to 115°, more preferably 85° to 105°. Similarly, the flooring may contain a plurality of additional protrusions to direct water flow in a desired direction front to back in the vehicle, of any geometry (e.g. straight or curved). As noted, the water flow is preferably directed towards a drain hole or even a plurality of drain holes. Preferably, one may therefore utilize relatively straight rib protrusions 34 that preferably have a length in the range of 12.5 mm to 550 mm and a thickness (the dimension that protrudes from the surface of the floor) preferably in the range of 1.0 mm to 30 mm. Also illustrated is a drain hole 36. As alluded to above, one may utilize a plurality of drain holes.

In addition, the portion of the vehicle floor 10 itself is configured such that when running front to back in the vehicle, provides a sloping surface facing the vehicle occupant which as illustrated by arrow 38, defines a slope of up to 10° to assist in directing residual water to a desired location, such as drain hole 36. Accordingly, the broad context of the present disclosure, the vehicle floor, when running front to back in the vehicle, may provide a sloping surface of 0° to 10°, more preferably 0.5° to 10°, and even more preferably 2° to 4°, or even 1° to 2°.

In addition, the vehicle floor itself may include a side-to-side slope as shown by arrows 40 and 42 of also up to 10° to again assist in directing water to drain hole 36. Accordingly, in the broad context of the present disclosure, the vehicle floor, when running side to side in the vehicle, may provide a slope of 0° to 10°, more preferably 0.5° to 10°, and even more preferably 2° to 4°, or even 1° to 2°. In addition, although drain hole 36 as illustrated in FIG. 6 is not positioned at a center location with respect to the horizontal axis of the portion of vehicle floor 10, it should be appreciated that the drain hole may be positioned anywhere along such horizontal axis to capture the flow of residual water.

In addition, it should be appreciated the boundary 42 of vehicle floor portion 10 may provide a border section that prevents any residual water from flowing further back in the vehicle. Such border section may therefore include a raised portion or even an upwardly angled wall portion to restrict such water flow.

Attention is now directed to the web regions between the plurality of "L" shape rib protrusions 26, identified by double arrows 44, 46, 48 and 50. These web regions are configured to provide an additional sloping vehicle floor surface that faces the vehicle occupant, in the general direction of the arrows, where such web regions may provide a downwardly sloping floor at an angle in the range of 0.5° to 20° or 0.5° to 10°. As may be appreciated the web regions between the plurality of "L" shape rib protrusion 26 can therefore provide another directed pathway for the flow of any residual or accumulated water on the floor portion 10 towards drain hole 36.

It should be appreciated that the above vehicle floor portion can be provided in a standard vehicle at four general locations, including the driver side location, right front seat passenger location, and two rear seat passenger locations.

Finally, it should be noted that the portion of the vehicle floor containing the raised portions and sloping portions may be integrally formed with the floor and preferably constructed of a thermoplastic elastomer, thermoplastic olefin, polyethylene (e.g. low density polyethylene), and polyurethane type materials (thermoplastic or thermoset).

As may therefore be appreciated, the present invention is broadly directed to a vehicle floor that includes a plurality of ribs and sloping wall portions to selectively channel water/debris to a desired location in the vehicle where it can then be conveniently discharged from the vehicle interior. The floor may therefore include one or a plurality of plugged openings that the vehicle occupant can open. The openings may also be selectively positioned at different locations on the vehicle floor, via use of selectively placed openings in the rib sections that will allow for the water/debris to reach a particular location for removal.

What is claimed is:

1. A vehicle floor configured to direct water flow comprising:
   a floor portion that extends front-to-back and side-to-side in the vehicle including a surface that faces the vehicle occupant, wherein said surface that faces the vehicle occupant provides a downward slope of up to 10° running front-to back in the vehicle and a downward slope of up to 10° running side-to-side in said vehicle;
   one or a plurality of rib protrusions in said vehicle floor surface;
   one or a plurality of web regions between said plurality of rib protrusions wherein said web regions provide a downwardly sloping surface at an angle in the range of 0.5° to 20.0°;
   wherein said downwardly sloping floor surface running front-to-back in said vehicle and side-to-side in said vehicle, said one or plurality rib protrusions, said one or plurality of web regions between said plurality of rib protrusions, are configured to direct water flow to one or a plurality of desired locations.

2. The vehicle floor of claim 1 wherein said surface that faces the vehicle occupant provides a downward slope of 0.5° to 10° running front-to back in the vehicle and a downward slope of 0.5° to 10° running side-to-side in said vehicle.

3. The vehicle floor of claim 1 wherein said surface that faces the vehicle occupant provides a downward slope of 2° to 4° running front-to back in the vehicle and a downward slope of 2° to 4° running side-to-side in said vehicle.

4. The vehicle floor of claim 1 wherein said surface that faces the vehicle occupant provides a downward slope of 1° to 2° running front-to back in the vehicle and a downward slope of 1° to 2° running side-to-side in said vehicle.

5. The vehicle floor of claim 1 wherein said one or plurality of desired locations includes one or a plurality of drain holes.

6. The vehicle floor of claim 1 wherein said one or plurality of web regions provides a downwardly sloping surface at an angle in the range of 0.5° to 10°.

7. The vehicle floor of claim 1 wherein said one or plurality of rib protrusions protrude from said surface of the floor in the range of 1.0 mm to 30 mm.

\* \* \* \* \*